Oct. 24, 1950     E. M. McELHINNEY ET AL     2,526,960
PICKUP DEVICE
Filed June 3, 1944                               4 Sheets-Sheet 3
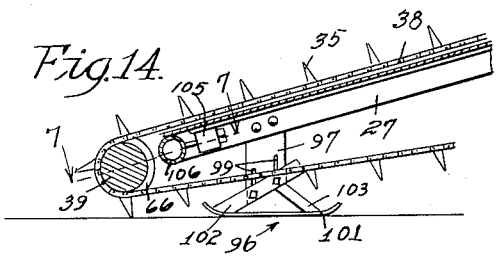
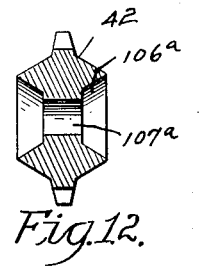
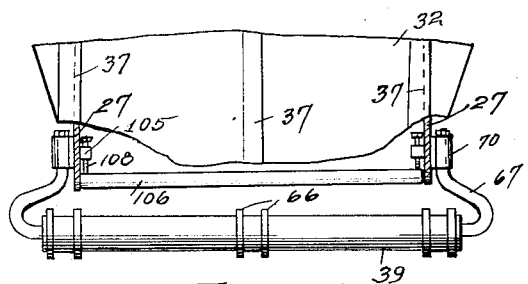
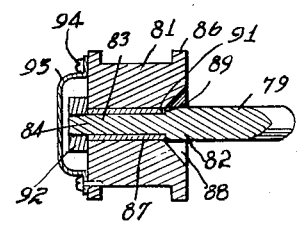
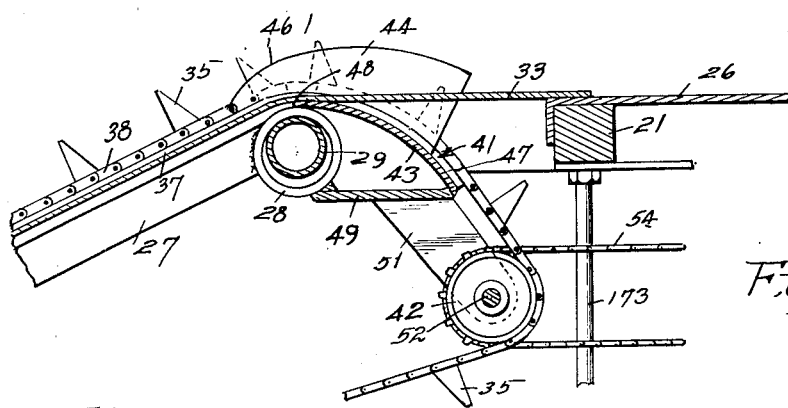
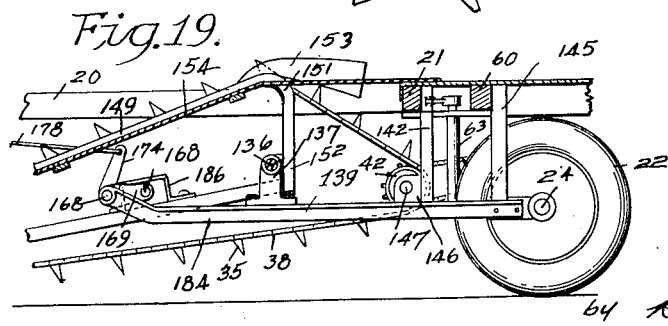
Inventors
Eric M McElhinney
Joseph B Kucera Oct. 24, 1950     E. M. McELHINNEY ET AL     2,526,960
PICKUP DEVICE
Filed June 3, 1944     4 Sheets-Sheet 4
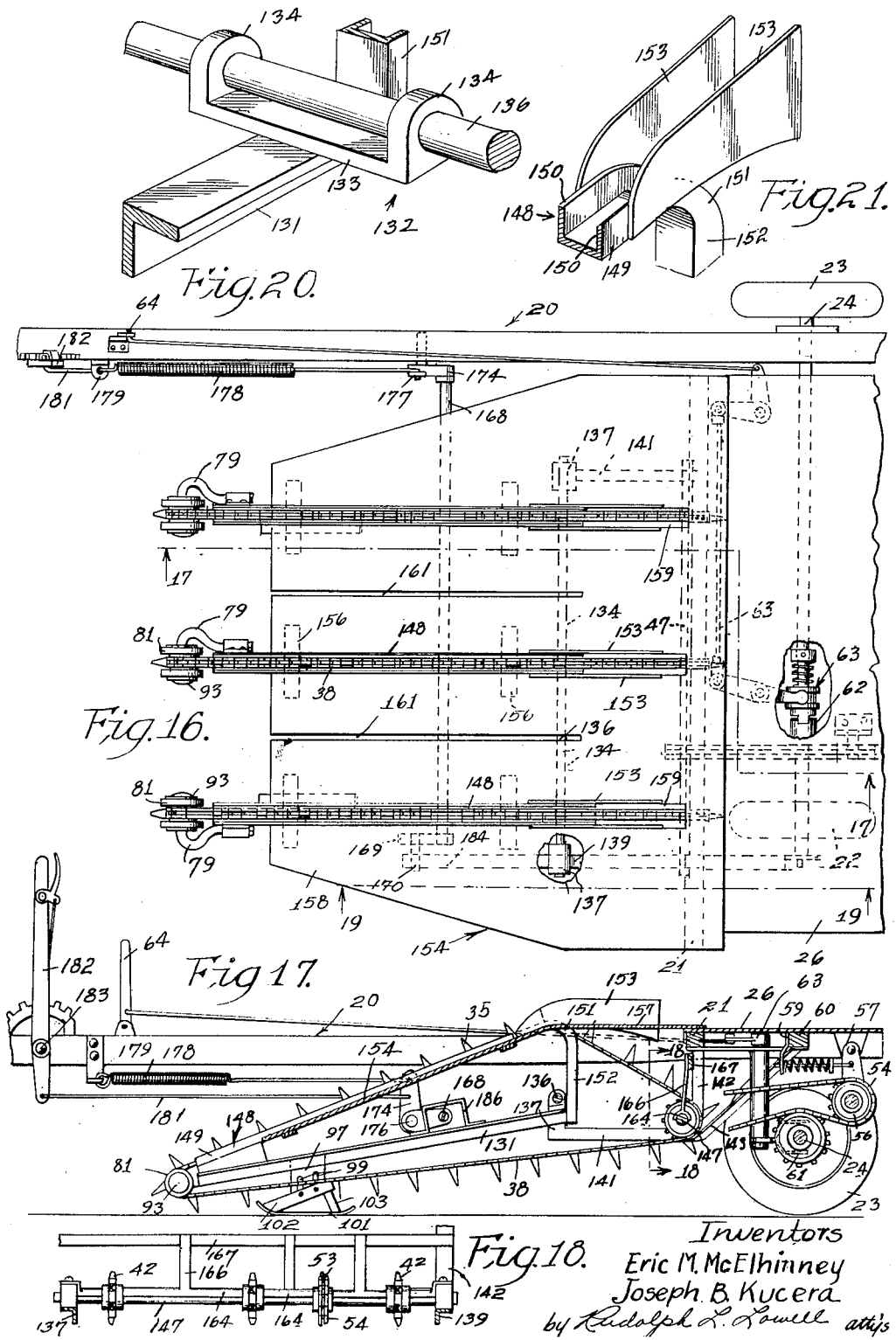
Inventors
Eric M. McElhinney
Joseph B. Kucera
by Rudolph L. Lowell att'ys Patented Oct. 24, 1950

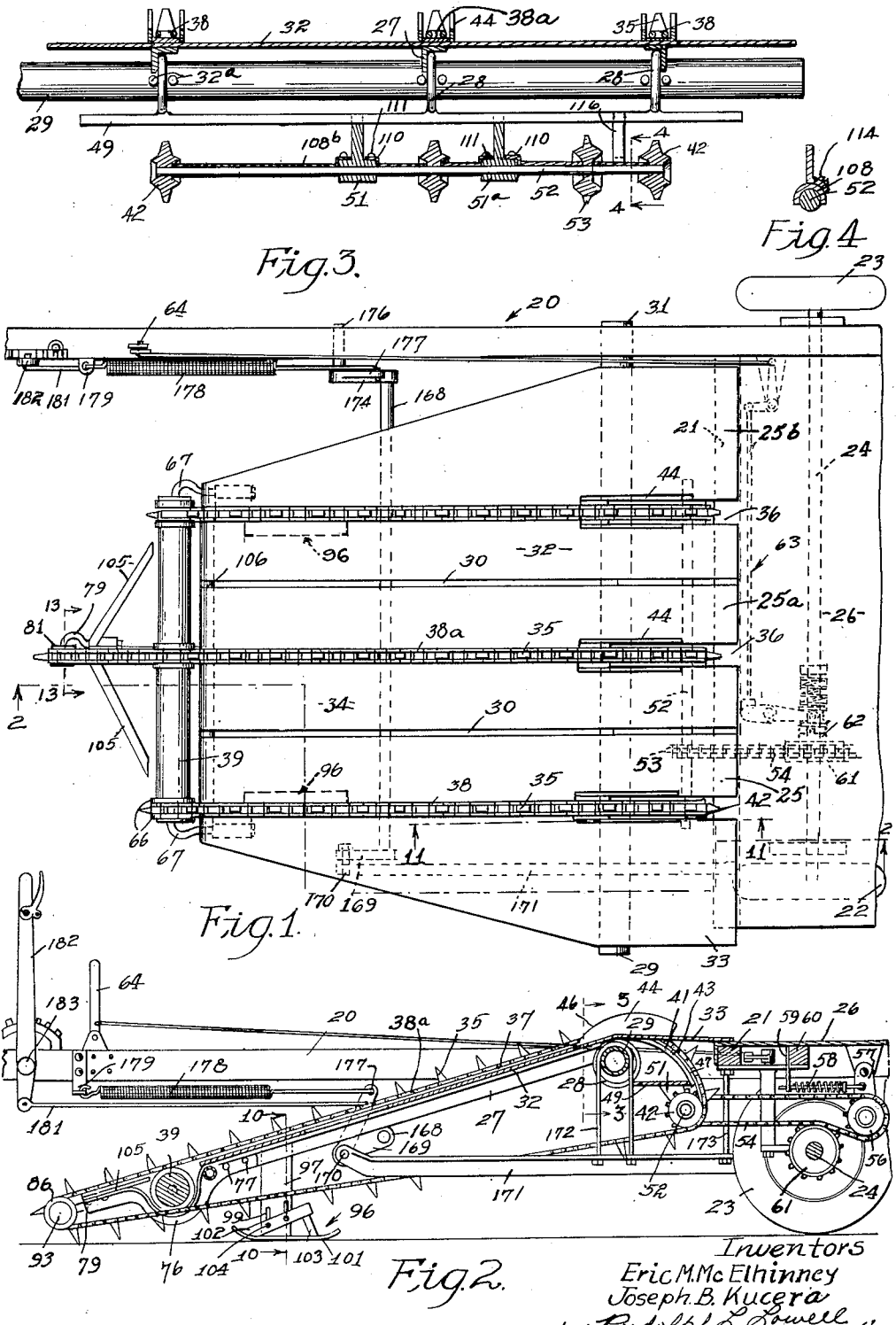

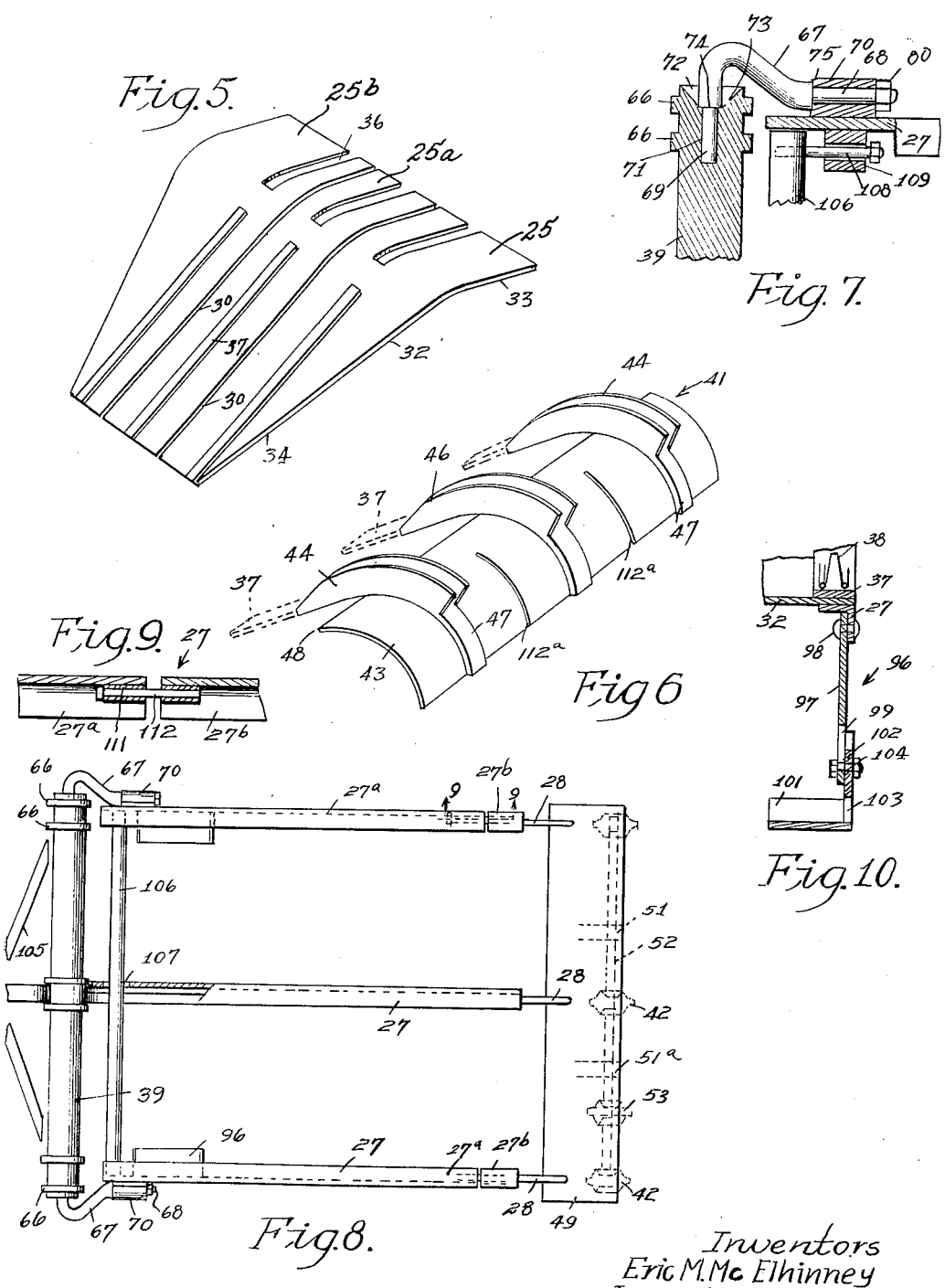

2,526,960

UNITED STATES PATENT OFFICE 2,526,960

PICKUP DEVICE

Eric M. McElhinney, Dysart, and
Joseph B. Kucera, Traer, Iowa

Application June 3, 1944, Serial No. 538,628

5 Claims. (Cl. 56—364)

This invention relates generally to devices for picking up cut material, such as hay, grain, hemp and the like, from the ground and in particular to a pick-up device including endless conveyor means extended forwardly and downwardly from a portable frame and adapted to gather cut material from the ground and deliver the gathered material to a receiving platform on the portable frame.

One type of pick-up device of the prior art generally includes one or more endless conveyors movably supported for rotational movement in a direction forwardly and rearwardly of the pick-up device and provided with spaced pick-up members for gathering cut material from the ground and carrying the cut material on the conveyors to a receiving portion usually located rearwardly of the pick-up device on a portable frame or on the machine with which the pick-up device is used. Another type of pick-up device includes a rotary cylinder or the like having radially extended pick-up fingers adapted to gather and then deliver the gathered material to an elevating conveyor or the like. In these pick-up devices considerable difficulty has been encountered by the wrapping of the cut material about the rotatable parts of the pick-up device and about the rotatable parts in the power transmission mechanism for the power pick-up device particularly where such mechanism is comprised of an open sprocket and chain assembly.

This wrapping of the cut material is objectionable because of the reduction in operating efficiency of the pick-up device and associated machinery, the loss of time and effort in removing the wrapped material from the pick-up device, the increased wear on the machinery and, where wrapping becomes excessive, the permanent damage to the machinery.

Yet another objection to the pick-up devices of both the endless conveyor and rotary cylinder types is found in the fact that the pick-up fingers, in the zone of transfer of the cut material from the pick-up device to a material-receiving platform or conveyor are quickly changed from a substantially upright position to a flat or horizontal position in their normal path of travel from the receiving platform to a pick-up position at the forward end of the pick-up device. By virtue of the relatively sudden change in the position of the pick-up fingers adjacent the receiving platform some of the material is carried by the pick-up fingers away from the receiving platform and is subsequently lost to the harvest by falling to the ground as the pick-up fingers are returned to their pick-up positions.

Although pick-up devices now commercially available are generally efficient they are not entirely satisfactory under conditions where the cut material has laid on the ground of a time period sufficient to permit a second growth of material or weeds to grow up therebetween. This situation arises for example when an appreciable time period is necessary to season the cut material before it is gathered. Under these conditions it is not only required that the pick-up device be adapted to accommodate itself to elevational differences in the ground surface in the path of travel of the pick-up device, but also that it be able to efficiently pick up the cut material from between the weeds and second material growth.

It is an object of this invention, therefore, to provide an improved pick-up device.

Another object of this invention is to provide a rotatable machine element for supporting an endless conveyor chain or the like which is adapted to prevent the wrapping of a windable material about its hub portions.

A further object of this invention is to provide a pick-up device for gathering and delivering material to a receiving platform in which the material at the end of the pick-up device adjacent to the receiving platform is positively removed and deposited on the receiving platform so as to prevent any of the cut material from traveling in the pick-up device beyond such delivery end.

Yet another object of this invention is to provide a pick-up device which is of a rugged and simple construction, flexible in operation to effectively pick up a wide variety of different kinds of cut material and efficient in operation over prolonged periods of use with a minimum of attention.

A still further object of this invention is to provide a pick-up device which is capable of efficiently picking up cut material from between weeds and a second growth of the material.

A feature of this invention is found in the provision of a rotary member for supporting an endless flexible means having at least one end face formed with an inwardly tapered recess concentric with its axis of rotation and adapted to cooperate with a stationary member having one end within the tapered recess and concentric with the axis of rotation of the rotary member to prevent the wrapping of any windable material adjacent such one end face of the rotary member.

Yet another feature of this invention is found in the provision of a pick-up device extended downwardly and forwardly from a receiving platform and having endless conveyors with pick-up members thereon, in which the upper ends of the conveyors are supported on means adapted to provide for the travel of the pick-up members to a position below the level of the receiving platform in a substantially upright position whereby to prevent the material delivered to the receiving platform from being carried away by the pick-up fingers.

Further objects, features and advantages of this invention will become apparent from the following description when taken in connection with the accompanying drawings in which:

Fig. 1 is a plan view of one embodiment of the pick-up device of this invention shown in assembly relation with a portable frame;

Fig. 2 is a longitudinal sectional view of the pick-up device taken on the lines 2—2 in Fig. 1;

Fig. 3 is a transverse sectional view as seen on the line 3—3 in Fig. 2;

Fig. 4 is a sectional view taken on the line 4—4 in Fig. 3;

Fig. 5 is a front perspective view on a reduced scale of the apron for the pick-up device shown in Fig. 1.

Fig. 6 is an enlarged rear perspective view of a unit for movably supporting the endless conveyors at the top or rear end of the pick-up device;

Fig. 7 is an enlarged sectional detail view of one end of a conveyor supporting roller which is extended across the forward or lower end of the pick-up device showing the assembly of the roller in the pick-up device, and corresponding to a section taken on the line 7—7 in Fig. 14;

Fig. 8 is an enlarged fragmentary plan view of the pick-up device with the apron, endless conveyors, and the unit in Fig. 6 removed;

Fig. 9 is an enlarged fragmentary sectional view of a conveyor arm member as seen on the line 9—9 in Fig. 8;

Fig. 10 is an enlarged sectional view of a ground runner taken on the line 10—10 in Fig. 2;

Fig. 11 is an enlarged sectional view taken on the line 11—11 in Fig. 1;

Fig. 12 is an enlarged sectional detail view of a sprocket for supporting an endless conveyor;

Fig. 13 is an enlarged sectional view taken on the line 13—13 in Fig. 1;

Fig. 14 is a fragmentary side elevational view illustrated similarly to Fig. 2, but on an enlarged scale relative to Fig. 2, of a modified form of the invention;

Fig. 15 is a fragmentary plan view of the pick-up device in Fig. 14 with parts broken away to more clearly show its construction;

Fig. 16 is a plan view of another modified form of the invention;

Fig. 17 is a sectional view taken on the lines 17—17 in Fig. 16;

Fig. 18 is a sectional view as seen on the line 18—18 in Fig. 17;

Fig. 19 is a sectional view on the line 19—19 in Fig. 16;

Fig. 20 is an enlarged fragmentary perspective view of the rear end of a pick-up arm in the embodiment of Fig. 16; and Fig. 21 is an enlarged perspective view of the material stripping means associated with each endless conveyor in the pick-up device of Fig. 16.

With reference to the drawings the pick-up device of this invention is illustrated in Figs. 1 and 2 assembled on a portable frame including a longitudinal frame member 20 and a transverse frame member 21, and supported on ground wheels 22 and 23 carried on a common axle 24. The portable frame may be part of a harvester or like machine adapted to handle cut material and includes a receiving platform 26 to which the cut material is delivered by the pick-up device.

The pick-up device includes a plurality of supporting arms 27, 27a and 27b, three of which are illustrated in Figs. 3 and 8, with the arms being of an angle iron construction and carried in a spaced relation laterally of the receiving portion 26. Welded to the rear end of each arm 27 is a supporting ring 28 by which the arms are pivotally supported at their rear ends on a pivot member 29 of a pipe construction, inserted through the ring members 28 and having one end 31 mounted on the longitudinal frame member 20. The pivot member 29 is located forwardly of the receiving portion 26 and in parallel alignment with the wheel axle 24 with the free ends of the arms 27 being extended forwardly and downwardly from the pivot member 29. The arms 27 are held against axial movement on the pivot member 29 by pin members 32a extended through the member 29 and arranged on opposite sides of each ring member 28.

Supported on the tops of the arms 27 is an apron 32 comprised of three separate longitudinally extended sections 25, 25a and 25b, arranged in a side by side relation. The apron has a flat rear portion 33 and a downwardly extended front portion 34. As clearly appears from Figs. 1 and 5 the apron front portion 34 is tapered inwardly from the rear portion 33. The apron 32 is of a sheet metal construction and each section 25, 25a and 25b thereof is formed at its rear portion with a slot 36 which are arranged in a spaced relation laterally of the apron 32 corresponding to the spaced relation of the arm members 27. The center apron section 25a is separated from the end apron sections 25 and 25b so as to form a pair of longitudinal slots 30 arranged at opposite sides of the central slot 36 in the central section 25a.

Extended longitudinally across the top of the front apron portion 34 are a plurality of straps or slide members 37 corresponding in number to the slots 36 and arranged in a spaced relation corresponding to the spacing between the slots 36 so as to be in alignment with a corresponding slot longitudinally of the apron 32.

A pair of outside endless conveyors 38 and an intermediate or center conveyor 38a, corresponding in number to the arms 27, are supported for rotational movement longitudinally of a corresponding arm by means including a rotatable or roller member 39 extended across the forward end of the pick-up device, and a supporting unit, indicated generally as 41, positioned at the rear or upper end of the pick-up device and operatively associated with conveyor driving sprockets 42. Each of the conveyors 38 and 38a is provided with spaced upright pick-up fingers 35.

The unit 41 is comprised of an arcuately shaped member 43 of a length less than the width of the apron rear end portion 33 (Figs. 1, 2 and 6). Spaced longitudinally of the member 43, on its convex side, and welded to such convex side in a spaced relation corresponding to the spacing of the arms 27, are curved stripper members 44 each of which includes a channel shaped front portion 46 and a rear portion 47 constituting an extension of the bottom of the front channel portion 46. The rear portions 47 terminate at the lower or rear side of the member 43, while the channel portions 46 project forwardly of the front side 48 of the member 43.

In the assembly of the unit 41 with the arms 27 the front side 48 of the member 43 is welded to the tops of the rings 28 at the rear ends of the arms 27 (Figs. 2 and 11). A flat supporting plate 49 of a length coextensive with the length of the member 43, is welded to the bottom of the rings 28 and to the rear lower side 47 of the member 43. Secured to and suspended from the bottom of the plate member 49 in a longitudinally spaced relation are a pair of bearing members 51 and 51a for rotatably supporting a shaft 52 on which the sprockets 42 are mounted (Figs. 3 and 8).

A driven sprocket 53 mounted on the shaft 52 is connected through a chain 54 with an idler sprocket 56 rotatably supported on a bracket 57 pivotally suspended from the portable frame 20 (Figs. 1 and 2). Spring means 58 are arranged in compression between the bracket 57 and a plate member 59, depended from a transverse frame member 60 of the portable frame, to maintain a continuous bias on the sprocket 56 in a direction away from the sprocket 53. The bottom side of the sprocket chain 54 is in engagement with a driving sprocket 61 rotatably supported on the wheel axle 24. The sprocket 61 is operatively associated with a slip clutch mechanism, indicated generally at 62 and manually operated through a link and lever system indicated as 63 and including a manual lever 64 located adjacent the forward end of the frame member 20.

As best appears in Figs. 1, 2, and 6 the front ends of the stripper members 44 project forwardly of the rear end portion 33 of the apron 32 whereby the bottom of the stripper members 44 cooperate with the strap members 37 to form a continuous wearing surface for slidably supporting the conveyors 38 and 38a as they travel upwardly on the top of the apron 32. The stripper members 44 are received through corresponding slots 36 in the apron 32, the rear end portion 33 of which extends rearwardly beyond the stripper members 44 to a supported position on the top of the material-receiving portion 26 on the portable frame. Thus on pivotal movement of the arms 27 about the shaft 29 the unit 41, shaft 52 and sprockets 42 and 53 are pivotally movable with the arms 27. During this pivotal movement the stripper members 44 are movable within the slots 36 and the rear end portion 33 of the apron 32 is slidable on the receiving portion 26. By virtue of the pivotal support of the bracket 57 the sprocket 56 is movable in response to the pivotal movement of the shaft 52 with the arms 27.

The roller member 39, which is extended across the forward ends of the arms 27, is of a cylindrical shape and formed with pairs of annular guides 66 forming peripheral annular grooves which are axially spaced on the roller and corresponding in numbers and in their spaced relation to the arms 27. These grooves are of a size to receive corresponding conveyors 38 and 38a. The roller 39 is rotatably supported at each end by means including stationary goose-neck members 67 each of which has a reduced rear portion 68 rotatably supported in a bearing 70 secured to an outside one of the arms 27 (Figs. 1 and 7). A goose-neck 67 is retained against axial movement by the engagement of a shoulder 75 with the front end of a bearing 70, and a collar and nut assembly 80 mounted at the free end of the reduced section 68 in bearing engagement with the rear end of the bearing 70. The front portions of the goose-necks 67 are coaxial with the roller 39 and each is formed with a reduced shaft section 69 receivable in bores 71 provided in the ends of the roller 39. The outer end of each bore terminates in an outwardly tapered recess or cavity portion 72, with the junction of the bore 71 and the recess portion 72 being defined by a shoulder 73 adapted for bearing engagement with a shoulder 74 defining the junction of the reduced section 69 with the main body of the front portion of a goose-neck 67. This engagement of the shoulders 72 and 73, at each end of the roller 39, retains the roller against axial movement relative to its goose-neck supports 67. From a consideration of Fig. 7 it is seen that the reduced section 69 is entirely within the bore 71.

The center one of the arms 27 is provided with a front extension 76 formed of an angle iron material, and secured at its rear end by bolts or the like 77 to the front end of the center arm 27, and having a downwardly curved center portion to pass about the roller 39 (Figs. 1 and 2). Secured to the front end of the extension 76 and projected forwardly from the extension 76 is a goose-neck member 79 for rotatably supporting a roller or rotatable member 81 (Figs. 1, 2 and 13). The front portion of the goose-neck 79 is extended across the front of the extension 76 parallel with the axis of the roller 39 and is formed with an enlarged section 82, and a reduced section 83, the free end 84 of which is threaded. The roller 81 is provided with a pair of peripheral shoulders 86 forming therebetween a peripheral groove adapted to receive the center conveyor 38a. An axial bore 87 in the roller 81 terminates at one end in a tapered recess or cavity portion 88, with an annular shoulder 89 defining the junction of the recess portion 88 with the bore 87.

In the assembly of the roller 81 with the goose-neck 79 the reduced section 83 is inserted within the bore 87 from the recessed side of the roller so that the shoulder 89 engages a shoulder 91 at the junction of the sections 82 and 83 of the goose-neck 79. With the shoulders 89 and 91 in bearing engagement the annular groove on the roller 81 and the center annular groove on the roller 39 are in alignment longitudinally of the pick-up device. This engagement of the shoulders 89 and 91 also holds the roller 81 against axial movement in one direction. Retention of the roller 81 against movement in an opposite direction is accomplished by a collar and nut assembly 92 on the threaded end 84 of the reduced section 83. The assembly 92 is covered with a cap member 93 secured to the roller 81 by screws 94 so as to be rotatable with the roller.

As previously mentioned the arms 27 are pivoted at their corresponding rings 28 on the shaft 29 for pivotal up and down movement. The lowermost pivotal movement of the arms 27 is limited by the contact engagement of shoes 96 with the ground (Figs. 2, 8 and 10). A shoe 96 is carried on each of the outside arms 27 and comprises an upright supporting plate 97 secured at its upper end to an arm 27 by bolts 98 and having a pair of transversely spaced slots 99 adjacent its lower end. A curved runner 101 is provided with an upwardly and rearwardly inclined bar member 102 and a brace member 103. The bar 102 has openings corresponding to the slots 99, with bolts 104 being extended through aligned slots 99 and openings in the bar 102 to adjustably support the runner on the plate 97. This adjustable support provides for the adjustment of the arms 27 to a position at which the pick-up fingers 35 on the central conveyor 38a, and specifically those fingers 35 about the roller 81, are in contact engagement with the ground, as shown in Fig. 2. Since the roller 39 is spaced rearwardly from the roller 81 the pick-up fingers 35 on the outside conveyors 38 are spaced above the ground.

The pick-up device in Fig. 1 is best adapted for gathering what shall be referred to as stalk material, that is material having stalks or stems and generally cut in windrows with the stalks extended transversely of the windrow. In the operation of the pick-up device the conveyors 38 and 38a are connected in a driven relation with the ground wheels 22 and 23, and the portable frame advanced along a windrow of stalk material so that the roller 81 travels substantially centrally of the windrow. This material is picked up at its center or intermediate its ends by the center conveyor 38a and onto a pair of supporting bars 105 secured at one end to the forward end of the extension 78 and diverged outwardly and rearwardly to positions adjacent to the roller 39 (Figs. 1 and 8). The bars 105 constitute supports for the opposite ends of the stalk material which is carried by the central conveyor on the bars 105 to the roller 39 to be engaged by the pick-up fingers 35 on the outside conveyors 38 and then carried upwardly on the apron 32 by all three of the conveyors 38 and 38a.

As best appears from Figs. 2 and 11 when the material approaches the upper end of the apron 32 it is gradually removed from the pick-up fingers 35 by the stripper members 44, and side walls of which have their front ends upwardly inclined or tapered from the straps 37. The vertical height of the side walls on the channel portions 46 of the strippers 44 is less than the height of the pick-up fingers 35 so that the movement of the material is continued upwardly on the apron 32 as the fingers advance within the channel portions 46.

When the fingers 35 reach the rear ends of the channel portions 46 they travel downwardly below the top level of the channel side walls by virtue of the support of the conveyors 38 and 38a on the curved member 43. The curvature of the member 43 is such that the fingers 35 are retained in a substantially upright position as they move out of the stripper members and in a direction toward the receiving platform 26. As a result of this movement of the pick-up fingers 35 out of engagement with the gathered material, and their continued movement downwardly and rearwardly from the stripper members 44 along a path such that the fingers 35 are retained in a substantially upright direction, all of the material is removed from the pick-up fingers 36 adjacent the receiving portion 26. The retention of the fingers in a substantially upright position as they are moved out of engagement with the material eliminates any tendency of the pick-up fingers to carry any of the gathered material from the apron 32 downwardly toward the sprockets 42. The material carried by the conveyors 38 and 38a to the receiving portion 26 is carried away therefrom by suitable feeding means (not shown).

Because of the roller 81 being supported on the extension 78 forwardly of the roller 39, and in turn of the apron 32, stalk material is capable of being efficiently picked up even after being on the ground for a length of time to permit weeds, second growth material and the like to grow up therebetween. Where the lower end of the apron extends to a position adjacent to the ground, such lower end tends to bend the second growth material or weeds forwardly of the pick-up device. When this bending action takes place it is apparent that the material to be gathered must be picked up from beneath the bent-over portions of the second growth material. By virtue of the front end of the apron 32 being spaced rearwardly from the roller 81 the second growth material is permitted to stand in an upright position whereby to facilitate the picking up of the cut material out of such second growth material.

Since only the roller 81 is in contact engagement with the ground surface it is apparent that the pick-up device is readily movable laterally relative to the ground in response to the travel of the shoes 96 over uneven ground. This lateral movement is facilitated by the provision of means providing for a relative pivotal movement between the arms 27.

Thus as shown in Figs. 1, 7 and 8 the front ends of the arms 27 are retained against spreading away from each other by means including a tubular pipe member 106 loosely extended through an opening 107 in the center arm 27 and extended between the outer arms 27. Each end of the member 106 carries a radially projected bolt 108 which is pivoted in an eye member 109 extended laterally from the inside of an outer arm 27 in a direction normal to an associated bolt 108. It is seen, therefore, that the forward ends of the arms 27 are held against movement inwardly toward each other by abutting engagement with the tubular member 106 and against movement outwardly from each other by the eye and bolt assemblies 108—109. Due to the pivotal support of the bolts 108 in the eye members 109 the outer arms 27 are capable of relative pivotal movement in an up and down direction.

Relative pivotal movement between the arms 27 is furthher facilitated by the pivotal connection of a forward portion 27a of each of the outer arms 27, with its corresponding rear portion 27b (Figs. 8 and 9). The rear end of a front portion 27a carries a tubular member or sleeve 111 for rotatably receiving a pin 112 welded at one end to the rear portion 27b, and projected forwardly from such rear end portion. By virtue of this pivotal connection between the front and rear portions of the outside arms 27, such portions are capable of relative pivotal movement independently of the pivotal movement of the arms on the shaft 29.

The apron 32 is of a flexible material which, in conjunction with the slots 30 and 36, provides for a lateral bending movement of the apron in response to a relative pivotal movement between the arms 27, with the rear end 33 of the apron being slidable on the receiving platform 26 in response to such pivotal movement. To reduce any opposition from the member 43 to a relative pivotal movement between the arms 27, slots 112a are provided in the rear portion of the member 43 to each side of the central stripper member 44.

It is seen, therefore, that the pick-up device is pivotally supported at its rear end on the shaft 29, and with the arms 27 being capable of relative pivotal movement to adapt the pick-up device to differences in ground elevation which may occur in its path of travel.

When the pick-up device is not in use, as when it is being moved from one windrow to a second windrow, the arms are concurrently lifted upwardly to a position at which the pick-up fingers 35 on the central conveyor 38a are out of contacting engagement with the ground by means including a rod 168 extended transversely of the pick-up device and below the arms 27 intermediate their ends (Figs. 1 and 2). The rod 168 is mounted at its outer end in the free end of a rocker arm 169 pivoted at 170 on the front end of a horizontal frame member 171 suspended from the shaft 29 on an inverted U-shape bracket 172 and from the transverse frame member 21 on a rod member 173. The inner end of the rod 168 is mounted on one arm 174 of a bell crank which is pivoted at 176 on the frame member 20. A second bell crank arm 177 is connected to one end of a spring 178, the opposite end of which is attached to the frame member 20 at 179. Also operatively connected to the bell crank arm 177, by a rod 181 is a manually operated lever 182 which is pivoted at 183 on the frame member 20.

On pivotal movement of the lever 182 toward the left, as viewed in Fig. 2, the rod 168 engages the underside of the arms 27 and moves the arms 27 upwardly. During a normal operation of the pick-up device the lever 182 is moved to the left until the pick-up fingers 35 on the central conveyor 38a are in contact engagement with the ground, and the arms 27 in contact engagement with the rod 168. The arms are thus yieldably supported on the rod 168, by virtue of the action of the spring 178, so that any relative pivotal movement therebetween takes place smoothly and without any sudden jarring action.

In pick-up devices generally considerable difficulties have been encountered due to the wrapping or windable characteristics of the material being gathered, and its tendency to wrap about the rotatable members which support the conveyors. As a result of this wrapping the rotatable members for supporting the conveyors, as well as the bearing members for the rotatable members, are subjected to hard wear so as to require frequent replacement, and in those instances where the wrapping condition is particularly aggravated these members may be permanently injured or damaged. This objectionable wrapping of material about the rotatable supports for the conveyors is eliminated in the present invention by the relative construction and assembly of the roller 81 with its corresponding support 79, of the roller 39 with its support 67, and the construction of the sprockets 42 and 53 for driving the conveyors.

With reference to Fig. 13 it is seen that the cap 93, which is secured at one end of the roller 81 and rotatable with the roller, completely covers the washer and nut assembly 84 so that there are no parts at this end of the roller about which the gathered material can wrap. The opposite end of the roller 81 is formed with the recessed portion 88 which terminates at the shoulder 89. With the roller 81 rotatable on the goose-neck member 79, which is stationary, any tendency of material to wrap about the goose-neck member will come as a result of the rotation of the roller 81. However, by virtue of the inwardly tapered recessed portion 88 any material which may rotate with the roller 81 tends to travel axially of the goose-neck portion 82 to a position within the recessed portion 88. During this axial travel of the material the wall of the recess 88 effectively throws the material in a direction outwardly from the recess 88 so as to prevent its winding about the portion 82 within the recess. In other words, the inwardly tapered form of the recess or cavity 88 on rotation of the roller 81 functions as a guard to prevent material from winding about the goose-neck portion 82.

A similar action against the winding of material about the goose-neck members 67 for the roller 39 takes place due to the inwardly tapered recesses or cavities 72 at each end of the roller 39, and the rotation of the roller 39 relative to its stationary goose-neck supports 67.

Winding of any material about the sprockets 42 and 53 is prevented by their construction and assembly with the shaft 52. Since these sprockets are of a similar construction only one of the sprockets 42 will be referred to in detail in the following description.

The sprocket 42 (Fig. 3) is formed at each end of its hub portion with an inwardly tapered recessed portion 106a which terminates at the bore 107a for receiving the shaft 52, with the outer ends of the recessed portions 106a defining the ends of the sprocket 42. With the sprocket 42 mounted on the shaft 52 it is apparent that the sprocket and the shaft are rotatable as a unit. When thus assembled the recessed portions 106a alone would be ineffective to prevent material from wrapping around the shaft due to the concurrent rotation of the shaft and the sprocket. To prevent wrapping, therefore, the shaft is partially enclosed between adjacent sprockets 42 and 53 by stationary semi-circular or curved members 108b extended between adjacent sprockets and within the recessed portions 106 in the sprockets (Figs. 3 and 4). The members 108b may be of a tubular construction but a semi-tubular construction is used to provide for their ready assembly with the shaft and sprockets.

The members 108b at their ends adjacent a bearing 51 or 51a are formed with an enlarged portion 110 adapted to fit over an associated bearing. The portions 110 are secured to an associated bearing by screws 111 to retain the members 108b against axial and rotatable movement relative to the shaft 52. The member between the sprocket 53 and the outer sprocket 42 is of a straight form over its complete length and is held against rotation by its connection through screws 114 with a strap member 116 suspended from the plate member 49. By virtue of this assembly of the stationary sleeve members 108b within the recessed portions 106a of the sprockets 42 and 53 a winding of material about the sprockets and the shaft 52 is completely eliminated in a manner similar in all respects to that previously explained in connection with the roller 81.

The modified form of the invention shown in Figs. 14 and 15 is similar in all respects to the pick-up device shown in Fig. 1, except for the elimination of the extension 76 and roller 81 on the central arm 27. Similar numerals of reference, therefore, will be used to designate like parts.

The pick-up device in Figs. 14 and 15 is adapted for gathering tangled material such as hay, soybeans, alfalfa and the like and includes arms 27, conveyors 38, a roller 39 and shoes 96 similar in construction and relative assembly in all respects the same as the like parts in the pick-up device of Fig. 1. Their further description, therefore, is believed to be unnecessary.

The shoes 96 on the outer arms 27 are adjusted so that the pick-up fingers 35 on all the conveyors 38 are in contacting engagement with the ground, as illustrated in Fig. 14.

In the operation of the pick-up device in Figs. 14 and 15 the material is gathered from the ground by the pick-up fingers 35 and then carried upwardly on the apron 32 to the strippers 44, where the material is removed from the fingers 35 and carried to the receiving portion 26 in all respects as previously described for the material in connection with Fig. 1.

By virtue of the roller 39 being adjacent to the ground and extended across the front of the pick-up device its opposite ends will be subject to appreciable differences in elevation of the ground surface. However, by virtue of the rotatable support of the goose-neck members 67 in their corresponding bearing members 70 it is apparent that one end of the roller 39 is capable of being tipped upwardly relative to its opposite end. Because of this tipping action and the over-all flexibility in the pick-up device as provided by the pivotal support of the arms 27, and the construction of the apron 32 and unit 41, the device readily accommodates itself to uneven ground surfaces so as to maintain the roller 39 in a position adjacent to the ground.

In Figs. 16-21, inclusive, there is disclosed another modified form of the invention in which the roller 39 is eliminated and an individual roller 81 is used with each of the pick-up arms.

The pick-up device in Figs. 16-21, inclusive, is carried on a portable frame similar in all respects to the portable frame used with the pick-up device in Fig. 1 and is best adapted for picking up stalk material. The pick-up device includes three arm members 131, of an angle iron construction, provided at their rear ends with bearing units 132 each of which comprises a flat bar 133 extended laterally of an arm 131. A pair of bearing members 134 are spaced longitudinally of the bar 133 and adapted to receive a shaft 136 to pivotally support the arms 131 at their rear ends for pivotal up and down movement.

The shaft 136 is carried at opposite ends in bearing units 137 oppositely arranged on horizontal frame members 139 and 141. (Figs. 16, 17 and 19.) The frame members 139 and 141 are supported at their rear ends on frame members 142 suspended from the frame member 21 of the portable frame. Braces 143 and 145 at the rear ends of the frame members 141 and 139, respectively, are connected to the frame member 60 on the portable frame.

Rotatably supported on the arms 139 and 141 in bearings 146 and adjacent the upright supports 142 in a shaft 147 for carrying the sprockets 42 and 53, the sprocket 53 being connected by the sprocket chain 54 with the idler sprocket 56 and the driving sprocket 61, which are operatively assembled in a driven relation with the ground wheels 22 and 23 in all respects similar to the like parts previously described in connection with Fig. 2.

Each arm 131 is provided with a guide member 148 for supporting a corresponding conveyor 38. Each guide member is of a channel construction and integrally formed with a front portion 149 inclined upwardly and rearwardly from the front end of a corresponding arm 131 to a position level with the receiving portion 26 on the portable frame, and terminating in a downwardly curved portion 151 having an upright rear extension 152 extended downwardly for connection to the rear end of an arm 131 (Figs. 17 and 19). The conveyors 39 are guidably supported in the front portions 149 of the guide members 148 for movement longitudinally and upwardly of the pick-up device.

The conveyors 38 are supported at the front ends of the arms 131 on rollers 81 rotatably mounted on goose-neck members 79 the rear end portions of which are secured to the arms 131 in all respects similar to the assembly of the roller 81 with the goose-neck member 79 as was fully described in connection with Figs. 1 and 13. Each conveyor 38, therefore, is supported for rotational movement on a corresponding roller 81, a guide member 148 and a sprocket 42. From a consideration of Fig. 17 it is seen that the sprocket shaft 147 and the arm supporting shaft 136 are spaced downwardly from the curved portions 151 of the guide members 148, and with the shaft 136 positioned forwardly of the shaft 147, so that the conveyors travel in a path upwardly and rearwardly of the pick-up device from the rollers 81 to the curved portion 151, downwardly and rearwardly to the sprockets 42 and then forwardly from the sprockets 42 back to the rollers 81.

Oppositely arranged at the rear end of each of the front portions 149 of the channel guide members 148 are a pair of stripper plates 153 secured in upright positions to the legs 150 of the members 148 and extended rearwardly from a corresponding curved portion 151 to a position adjacent the receiving portion 26 on the portable frame (Figs. 16, 17 and 21). An apron 154 is carried on supporting members 156 extended transversely of and secured to the bottoms of the front portions 149 of the guide members 148 in a longitudinally spaced relation. The apron 154 comprises a rear portion 157 extended in a horizontal plane between the curved portions 151 of the guide members and the receiving portion 26. A front apron portion 158 extends from the curved portions 151 to a position spaced rearwardly from the forward ends of the arms 131. Slots 159 extended longitudinally of and arranged in a spaced relation transversely of the apron 154 receive the guide members 148.

The outer arms 131 are provided with shoes 96, which are assembled with the arms 131 in a manner similar to their assembly with the arms 27 as explained in connection with Figs. 2 and 10.

In the operation of the pick-up device in Figs. 16-21, inclusive, the shoes 96 are adjusted so that the pick-up fingers 35 on all of the conveyors 38 are in contacting engagement with the ground. With the conveyors 38 in driven relation with the ground wheels 22 and 23, as provided by the actuation of the slip clutch mechanism 63, and with the pick-up device advanced in a forward direction the cut material is picked up by the fingers 35 and carried upwardly of the pick-up device, in a supported position on the apron 154, to the stripper bars 153. The stripper bars 153 are inclined upwardly from the front portion 149 of the guide members 148 to a height substantially equal to the height of the fingers 35, and then curved downwardly within the slots 159 so as to terminate at a position adjacent to the receiving platform 26. As the material is carried by the conveyors 38 across the stripper bars 153 it is gradually lifted and removed from the fingers 35 while the fingers are in a substantially upright position and travelling in a direction rearwardly and downwardly away from the curved portions 151. Since the fingers 35 are not inverted until the conveyors travel about the sprockets 42, and with the sprockets located downwardly and rearwardly from the stripper bars 153, any grabbing or pulling of the material by the fingers 35 as the conveyors 38 initially travel downwardly from the guide members 153 is entirely eliminated.

Since the front ends of the arms are connected only to the apron 154 a relative pivotal movement between the arms 131 is accomplished by the provision of slots 161 formed in the apron 154 between adjacent arms 131 (Fig. 16). As a result, the apron 154 is flexible laterally thereof to provide for a relative pivotal movement of the arms 131 in response to variations in the level of the ground surface laterally of the pick-up device and in its path of travel.

By virtue of the construction of the rollers 81 and their relative assembly with goose-neck members 79 any wrapping of the cut material about the rollers is completely eliminated. Wrapping of the cut material about the sprockets 42 and 53 is eliminated by the provision of semi-tubular sleeve members 164 mounted on the shaft 147 between adjacent sprockets and extended within the recessed portions 108a of adjacent sprockets. The semi-circular sleeve members 164 are held against rotation relative to the shaft 147 by their securement with a corresponding strap member 166 suspended from a frame member 167 connected between the upright frame members 142 (Figs. 17 and 18). The members 164 cooperate with the sprockets 42 and 53, in all respects similar to the cooperation of such sprockets with their corresponding semi-circular members 108b as explained in connection with Fig. 3.

When it is desired to move the portable frame without operating the pick-up device, the arms 131 are pivotally raised upwardly to lift the rollers 81 out of contacting engagement with the ground by means including the rod or shaft 168, the assembly of which is the same in all respects to its assembly in the embodiment shown in Fig. 1 except for the pivotal support of the crank arm 169 at its outer end. Thus as shown in Figs. 16 and 19 the crank arm 169 is pivotally supported at the front end of an extension 184 integrally formed with the horizontal frame member 139. The operation of the lifting rod 168 in Fig. 16 is similar in all respects to its operation in the pick-up device in Fig. 1, so that a further description of such operation is believed to be unnecessary.

With reference to Fig. 17 it is seen that the rod 168 is adapted to engage the under side of an inverted U-shaped member 186 carried in an upright position on the arms 131, at a position substantially intermediate the ends of the arms 131. By virtue of the upward and rearward inclination of the front portions 149 of the guide members 148 the U members 186 are receivable in the space between an arm 131 and a corresponding guide member 148 so that the rod 168 is freely movable without interference with the guide members or the conveyors 38.

From a consideration of the above description it is seen that the invention provides a pick-up device which is of a simple and rugged construction, and capable of efficiently picking up a wide variety of cut material and carrying such material on endless conveyors to a receiving platform while eliminating any wrapping of the material about the rotatable supports for the conveyors. Provision is made for the efficient pick-up of cut material from between second growth material, and the positive removal of gathered material from the pick-up fingers for transfer of the material to a receiving platform or conveyor. Also the pick-up device is capable of flexible movement in a direction laterally or transversely thereof so as to readily accommodate itself to variations in the ground surface over which it travels.

Although the invention has been described and illustrated as having three pick-up arms adapted for relative pivotal movement it is to be understood that any number of arms may be used to provide for a desired width of the pick-up device depending upon the kind of cut material to be handled. Further although the invention has been described with respect to several preferred embodiments thereof it is to be understood that it is not to be so limited since modifications and changes can be made therein which are within the full intended scope of the invention as defined by the appended claims.

We claim:

1. A pick-up device attachable to a portable frame comprising a plurality of forwardly and downwardly inclined arms pivoted adjacent their rear ends on said frame for up and down movement, endless pick-up conveyors corresponding to said arms, means movably supporting said conveyors for longitudinal rotational movement about said arms including a transverse rotary member located forwardly of and between the outside ones of said arms and common to said conveyors, means for rotatably supporting said rotary member carried adjacent the front ends of said outside arms, an extension on the front end of an intermediate arm, a second rotary member at the free end of said extension for rotatably supporting the endless conveyor for said intermediate arm, with said second rotary member being in contact engagement with the ground so that said first rotary member is spaced above the ground.

2. A pick-up device for gathering cut material attachable to a portable frame having a horizontal material receiving portion, a forwardly and downwardly inclined unit supported adjacent its rear end at said material receiving portion, an endless conveyor having spaced upright pick-up members thereon, means supporting said conveyor for rotational movement longitudinally of said inclined unit including a first rotary member adjacent the front end of said inclined unit, an arcuate member for slidably supporting said conveyor extended downwardly and rearwardly from the rear end of said inclined unit, with the curvature of said arcuate member providing for said pick-up members being moved rearwardly in a substantially upright position below the level of said receiving portion, and a second rotary member for movably supporting said conveyor positioned below the rear end of said arcuate member.

3. A pick-up device for gathering material and delivering the gathered material to a horizontal material-receiving portion on a portable frame, comprising a member inclined forwardly and downwardly from the forward side of said receiving portion, an endless conveyor having pick-up members spaced thereon movably supported for movement longitudinally about said inclined member, a pair of oppositely arranged upright portions at the upper end of said inclined member projected rearwardly from said inclined member to said receiving portion, said conveyor being movable between said upright portions, with said upright portions having their front ends inclined upwardly and rearwardly and being of a height equal at least to the height of said pick-up members to provide for the gathered material being stripped from said pick-up members for delivery to said receiving portion.

4. A pick-up device for gathering cut material and delivering the gathered material to a horizontal receiving portion on a portable frame, a pivot means extended across and forwardly of said receiving portion, a plurality of downwardly and forwardly extended arms having ring portions at their rear ends pivotally supported on said pivot means, a plurality of endless conveyors corresponding to said arms having pick-up members thereon, means movably supporting said conveyors for rotational movement about said arms including an arcuate member extended rearwardly and downwardly from the rear ends of said arms to a position below said receiving portion, a plate member connected between said ring portions and the rear end of said arcuate member, bearing members suspended from said plate member, a shaft rotatably supported in said bearing members, rotary members operatively associated with said conveyors mounted on said shaft below the rear end of said arcuate member, with the contour of said arcuate member providing for said pick-up members being moved rearwardly in substantially upright positions below the level of said receiving portion.

5. A pick-up device for gathering cut material from the ground attachable to a portable frame, a plurality of forwardly and downwardly inclined arms pivoted adjacent their rear ends on said frame for up and down movement, a plurality of endless conveyors corresponding to said arms and having pick-up members thereon, means for movably supporting said conveyors including a transverse rotary member common to said conveyors and located forwardly of said arms, said rotary member having inwardly tapered cavities in the ends thereof terminating in axially extended bores, means for supporting said rotary member on said arms including a pair of oppositely arranged members mounted on the outside ones of said arms, with said oppositely arranged members having bearing portions receivable in said bores in a concentrically spaced relation with the side walls of said tapered cavity, with said side walls, on rotation of said rotary member, acting to prevent the cut material from winding about said oppositely arranged members.

ERIC M. McELHINNEY.
JOSEPH B. KUCERA.

REFERENCES CITED

The following references are of record in the file of this patent:

UNITED STATES PATENTS

| Number | Name | Date |
|---|---|---|
| 645,851 | Hebert | Mar. 20, 1900 |
| 1,095,445 | Alvey | May 5, 1914 |
| 1,106,171 | Wangsness | Aug. 4, 1914 |
| 1,427,320 | Phillips | Aug. 29, 1922 |
| 1,697,640 | Forbes | Jan. 1, 1929 |
| 1,742,453 | Van Derhoel | Jan. 7, 1930 |
| 1,780,472 | Gilger | Nov. 4, 1930 |
| 1,784,848 | Reichle | Dec. 16, 1930 |
| 1,803,735 | Simonds et al. | May 5, 1931 |
| 1,858,000 | Clausen | May 10, 1932 |
| 1,979,974 | MacGregor | Nov. 6, 1934 |
| 2,141,493 | Tallman | Dec. 27, 1938 |
| 2,171,779 | Young | Sept. 5, 1939 |
| 2,242,077 | Jones | May 13, 1941 |
| 2,253,797 | Melroe | Aug. 26, 1941 |